United States Patent [19]

Fletcher et al.

[11] 3,770,903

[45] Nov. 6, 1973

[54] IMAGE DATA RATE CONVERTER HAVING A DRUM WITH A FIXED HEAD AND A ROTATABLE HEAD

[76] Inventors: James C. Fletcher, Administrator of the National Aeronautics and Space Administration with respect to an invention of; Frederic C. Billingsley, Altadena, Calif.

[22] Filed: Feb. 22, 1972

[21] Appl. No.: 228,189

[52] U.S. Cl.................179/100.2 MD, 178/6.6 DD, 179/100.2 T, 340/174.1 L

[51] Int. Cl....... G11b 5/56, G11b 5/76, G11b 21/08

[58] Field of Search........... 179/100.2 MD, 100.2 K, 179/100.2 B, 100.2 T; 340/174.1 C, 174.1 L, 174.1 B, 174.1 K; 178/6.6 DD, 6.6 FS, 6.6 A, 6.6 TC, DIG. 3

[56] References Cited

UNITED STATES PATENTS

| | | | |
|---|---|---|---|
| 3,170,031 | 2/1965 | Okamura | 178/6.6 DD |
| 3,134,853 | 5/1964 | Okamura | 178/6.6 DD |
| 3,023,404 | 2/1962 | Dickerson | 340/174.1 C |
| 3,613,059 | 10/1971 | Dirks | 179/100.2 MD |
| 3,441,909 | 4/1969 | Monohan | 340/174.1 K |

OTHER PUBLICATIONS

IBM Technical Disclosure Bulletin, S. Mukai, Random Accessing of Flexible Magnetic Sleeve, Vol. 2, No. 5, February, 1960, Page 35

*Primary Examiner*—Vincent P. Canney
*Assistant Examiner*—Alfred H. Eddleman
*Attorney*—Monte F. Mott et al.

[57] ABSTRACT

A data-rate converter is disclosed comprising a rotatable data-storing drum with at least one fixed read/-record head and a rotatable read/record head. The latter is rotatable in a circular path about the drum axis of rotation. The drum is positionable in any one of a plurality of axial positions with respect to the heads, so that at least one drum track is aligned with the fixed head in one drum position and with the rotatable head in another drum position. When a track is aligned with the fixed head, data may be recorded therein or read out therefrom at a rate which is a function of drum rotation, while when aligned with the rotatable head, data may be recorded or read out at a rate which is a function of the rates and directions of rotation of both the drum and the head.

6 Claims, 3 Drawing Figures

IMAGE DATA RATE CONVERTER HAVING A DRUM WITH A FIXED HEAD AND A ROTATABLE HEAD

ORIGIN OF INVENTION

The invention described herein was made in the perfomance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to signal rate conversion and, more particularly, to a system for recording signals, representing data, at one rate and reproducing the data at a different rate.

2. Description of the Prior Art

All devices capable of storing or processing data, in the form of recordable or processable signals, have an upper rate limit at which the data can be entered or read out. If in an overall data processing system the data has to be accepted at one rate, e.g., video rate which is high, and delivered to a device with a lower data entry rate, some data rate converting means must be provided. Similarly, such means are needed when data is received at a low rate and for operation must be supplied to some device at a high rate. For example, such a need exists in image data processing in which image data is accepted from the output of a computer and has to be delivered at a higher rate to a video monitor for display purposes. The problem of data rate conversion is further complicated when the data is video information, represented by high frequency signals, which need be converted with a high degree of fidelity.

OBJECTS AND SUMMARY OF THE INVENTION

It is a primary object of the present invention to provide a new improved data-rate converter.

Another object of the present invention is to provide an improved data-rate converter which is capable of receiving data at one rate and reproduce it at a different rate with a high degree of fidelity.

These and other objects of the invention are achieved by providing a converter comprising a rotatable data-storing drum, such as a magnetically coated drum with data tracks axially located on its peripheral surface. The converter also includes at least one fixed read/-record head so that data is read out or recorded into a data track aligned with this fixed head at a rate which depends only on the drum's rate of rotation. Also included is a read/record head which, rather than being fixed, is rotatable about the drum's periphery. When the rotatable head is employed for data transmission (either read or record) between it and the data track aligned therewith, the transmission rate is a function of the rates of rotation of the drum and the rotatable head, as well as the relative directions of rotation of the head and the drum. The novel converter further includes means for axially moving the drum between several drum positions. The drum is positionable so that in one position a given data track is aligned with the fixed head and in a different position the same track is aligned with the rotatable head. Thus data may be recorded into the track by the fixed head at one rate and read out by the rotatable head at a different rate, while maintaining optimum signal fidelity. Several fixed heads may be incorporated and spaced axially about the drum so that at any drum position, data may be recorded in several tracks and read out from several tracks. Also, the track spacing may be chosen so that in any drum position, one track is always aligned with the rotatable head.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
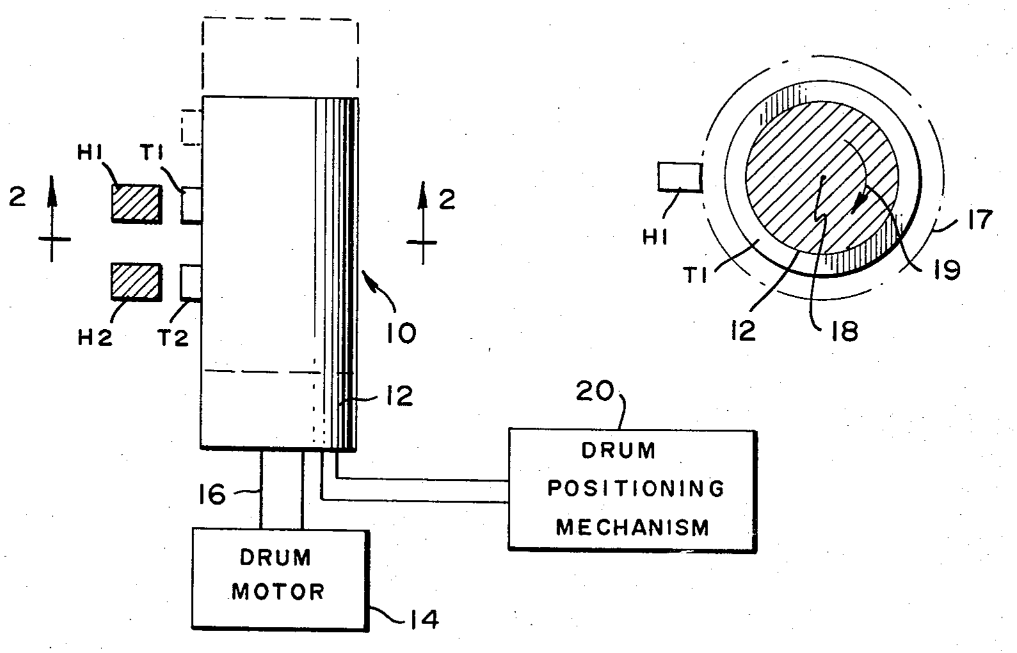
FIGS. 1 and 2 are respectively side and top views of a general embodiment of the invention.

Attention is first directed to FIG. 1 which is a simplified diagram of the novel converter 10, shown including a data storing drum 12, such as a magnetic drum with tracks T1 and T2 axially aligned about its periphery. The drum is assumed to be rotatable about its longitudinal axis by a drive unit 14, such as a motor which is coupled to the drum by shaft 16. As is appreciated by those familiar with the art, data may be recorded or read out from either track by rotating the drum and by the proper energization of a read/record head which is positioned adjacent the particular track. In FIG. 1, two read/record heads are shown and are designated by H1 and H2.

For the arrangement shown in FIG. 1, it is assumed that head H2 is fixed with respect to the housing (not shown) which houses the converter 10. Thus the rate at which data can be recorded into a track, aligned with H2 or read out therefrom is only dependent on the rate of rotation of the drum 12. On the other hand, head H1 is assumed to be rotatable about the periphery of the drum along a circular path 17, centered about the drum's longitudinal axis 18, as shown in FIG. 2. The rate at which data is recorded or read out by head H1 from the track which is aligned therewith, is a function of the rates and directions of rotation of the head and the drum. Assuming that the drum rotates clockwise, as designated by arrow 19, if the head H1 also rotates in the same direction, the rate of data transmission (read or record) is less than that achieved with fixed head H2. On the other hand, if H1 rotates in a direction opposite that of the drum, the rate of data transmission is greater than that achieved with fixed head H2.

In accordance with the present invention a drum positioning mechanism 20 is incorporated. Its function is to control the drum position along its axis 18 with respect to the heads. In FIG. 1, the solid lines represent one drum position P1, in which tracks T1 and T2 are respectively aligned with heads H1 and H2, while the dashed lines represent another drum position P2 in which track T2 is aligned with head H1.

Such an arrangement enables track T2 to be positioned adjacent either head. Consequently, when the drum is in position P1, fixed head H2 may be used to record data in T2 at a fixed rate. Thereafter, the drum may be shifted to position P2 so that T2 is aligned with rotatable head H1. By rotating head H1, the data from track T2 may be read out at a different rate. Similarly, T1 in position P2 may be used to store data recorded by head H1 at one rate and read out at a different rate by fixed head H2, when the drum is in position P1.

It should be stressed that in the particular diagram of the present invention, by axially moving the drum from one position to another, a track, such as T2, is alignable with either the fixed head H2 or the rotatable head H1, both of which are equidistantly disposed from the peripheral outer surface of the drum. Thus nearly optimum reproduction fidelity is achieved, since recording and readout is realized from the same side of the drum surface by equally spaced heads. The rate conversion is achieved by positioning the drum so that the same track is opposite one head, such as fixed head H2 in one drum position, when the data is recorded at one rate, and the same track is opposite another head, such as rotatable head H1 in another drum position, when data is read out at a different rate.

It should be apparent that the converter may include more than one fixed head. For example, by positioning another fixed head, data may be recorded and read out from track T1 at different rates in a manner similar to that herebefore described for track T2.

Figure 3:
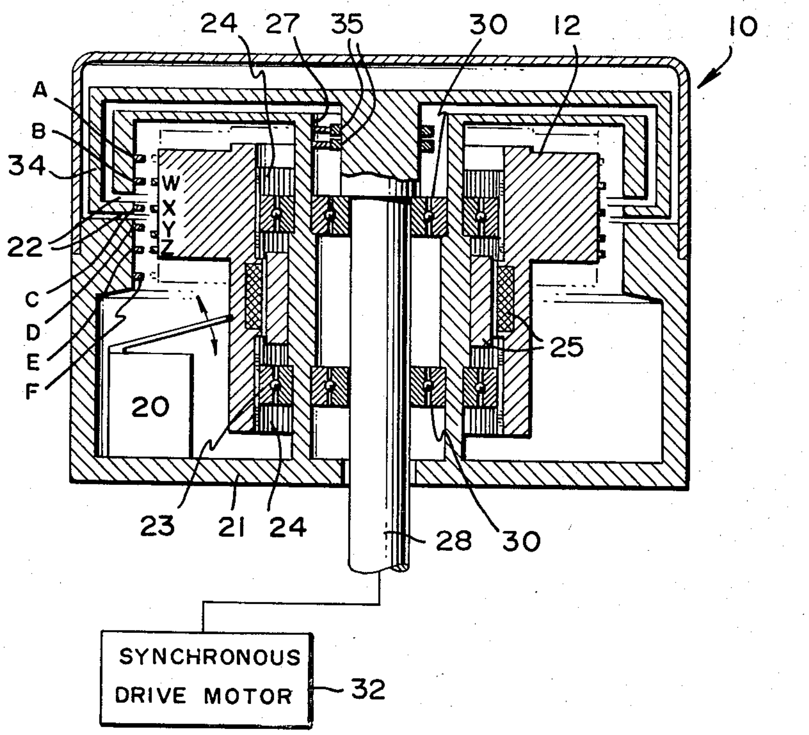
FIG. 3 is a combination side and cross-sectional view of a specific embodiment of the invention.

An embodiment of an arrangement with a plurality of fixed heads is diagrammed in FIG. 3 which is a cross-section of converter 10, shown including a stationary housing 21. The housing is essentially a hollow-walled cylinder with an annular slot 22. Housing 21 is also provided with bearings 23 with races splined to allow a sliding fit with splines 24 in drum 12. The latter, which is assumed to be driven by a synchronous motor 25, is assumed to have data tracks W, X and Y and a clock track Z on its outer peripheral surface. Drum position about its longitudinal axis is controlled by mechanism 20. Fixed to the inner surface of housing 21 adjacent the outer surface of drum 12 are heads A, B, D, E and F. Heads A and B are shown on one side of slot 22 and heads D, E and F on the other side of the slot.

The housing 21 is provided with a central bore 27, designed to accommodate a drive shaft 28 which is supported by bearings 30. The shaft 28 is assumed to be driven by a synchronous drive motor 32. Integrally connected to shaft 28 is an arm 34 which extends into slot 22 and supports a head C adjacent the drum surface. To prevent windage, the arm 34 may be formed as a complete, circularly symmetric cup. As shaft 28 rotates it in turn causes the rotation of arm 34 and therewith head C in a circular path, such as path 17 (FIG. 2) about the drum's longitudinal axis. Slip ring contacts 35 are provided between shaft 28 and housing 21. Their function is to provide electrical connection between the head C and the stationary housing 21.

In operation, with rotating drum 12 in mid-position as shown in FIG. 3, data track W can be read or recorded by stationary read/record head B. At the same time, data track X can be read or recorded by rotatable read/record head C. In this position track Y is inoperative. Clock track Z, which may be used for speed control, is read by stationary read-head E. By shifting drum 12 to the upper position, track W can be read or recorded by read/record head A, track X can be read or recorded by read/record head B. Track Y is put into operation with rotatable read/record head C, and clock track Z is read by read-head D.

By shifting drum 12 to the lower position, track W can be read or recorded by read/record head C, track X is inoperative, track Y is inoperative, and clock-track Z is read by read-head F. For example, referring now to the mid-position configuration, track W is recorded by head B at maximum data rate, from a video source. To reduce the data rate for computer entry, the drum 12 is shifted to the lower position by mechanism 20. This brings track W into alignment with rotatable read/record head C. Head C is rotated at a speed near that of drum 12, so that the relative speed between track W and head C is reduced. This effectively reduces the data rate to that necessary for computer entry. An alternate configuration of the device 10 could employ evenly spaced heads and tracks, with all heads read/record, so that all data tracks could be operative in any position.

From the foregoing it is thus seen that in accordance with the present invention a data rate converter is provided which includes a rotatable data storage drum which is positionable in any of a plurality of positions along its axis of rotation. Associated with the drum are a plurality of read/record heads, one of which is rotatable about the drum in a circular path centered about the drum's axis of rotation. The heads are so spaced along the drum's axis of rotation so that there is at least one track which is aligned with a fixed head in one drum position and with the rotatable head in another drum position. This enables data to be recorded and read out from this track at different rates. Herebefore, each of the heads as assumed to be a read/record head. Clearly some heads may be chosen as read heads only while others may serve only as record heads. The connections between the heads and the circuits, which either supply signals thereto or receive signals therefrom, have been purposely deleted since such circuits are well known in the magnetic recording art in which such circuits and heads are employed.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A data rate converter comprising:
- a housing;
- a drum having a longitudinal axis, being disposed rotatably in said housing, and defining a plurality of tracks about the peripheral surface of said drum and spaced along the longitudinal axis of said drum, each track being capable of storing data therein, said drum being movable selectively along said axis;
- a drum motor coupled to said drum on said longitudinal axis thereof, for rotating said drum about said longitudinal axis at a selected rate of rotation;
- a position control mechanism in operative engagement with said drum for positioning said drum in any one of a plurality of positions along said axis with respect to a reference position;
- at least a first energizable head fixedly positioned in said housing with respect to said reference position of said drum, and spaced from said drum periphery in alignment with one of said plurality of tracks when said drum is in one of said plurality of positions, for communicating data to or from the track with which it is aligned;

an arm being rotatable co-axially about the periphery of said drum at a preselected rate different from the rate of rotation of said drum; and a second energizable head supported on said rotatable arm adjacent one of said tracks when said drum is in one of said positions.

2. The arrangement as recited in claim 1 wherein said tracks include a clock track for storing clock signals and said converter includes a plurality of fixed heads so that in any position of said drum said clock track is aligned with one of said heads.

3. The arrangement as recited in claim 1 wherein said drum includes a first position in which a selected track is aligned with said first energizable fixed head and a second position in which said selected head is aligned with said second energizable head, whereby data recorded in said selected track by said first head when the drum is in said first position at a first rate which is a function of the rate of rotation of said drum is read out by said second head when said drum is at said second position at a rate which is a function of the rates of rotation of said drum and said rotatable arm.

4. The arrangement as recited in claim 3 wherein said tracks include a clock track for storing clock signals, and said converter includes a plurality of fixed heads so that in any position of said drum said clock track is aligned with one of said heads.

5. A data rate converter comprising:

a housing;

a multitrack drum disposed rotatably in said housing;

at least one energizable head positioned fixedly in said housing adjacent said drum for communicating data to or from a track on said drum with which said one fixed head is aligned;

a head rotatable at a controlled rate about said drum for communicating data to or from a track on said drum with which said rotatable head is aligned; and a mechanism in engagement with said drum for axially positioning said drum between at least a first and a second position whereby in said first position a track on said drum is aligned with said fixed head and in said second position the same track is aligned with said head rotatable about said drum.

6. The arrangement as recited in claim 5 wherein said converter includes a plurality of fixed heads and said drum defines a clock track for storing clock pulses, said clock track being aligned with one of said fixed heads in any of said axial drum positions.

* * * * *